(12) United States Patent
Huang et al.

(10) Patent No.: US 6,735,548 B1
(45) Date of Patent: May 11, 2004

(54) METHOD FOR AUTOMATED NETWORK AVAILABILITY ANALYSIS

(75) Inventors: Jiandong Huang, San Jose, CA (US); Madhav Marathe, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 09/832,427

(22) Filed: Apr. 10, 2001

(51) Int. Cl.[7] .................. G06F 101/14; G06F 15/00; G06F 17/18
(52) U.S. Cl. .................. 702/179; 716/4; 709/223
(58) Field of Search .................. 702/179–188; 716/4; 709/223, 224; 370/235, 237, 238, 248, 252, 254–258

(56) References Cited

U.S. PATENT DOCUMENTS 5,809,282 A * 9/1998 Cooper et al. .............. 700/49
6,003,090 A * 12/1999 Puranik et al. ............. 370/229
6,081,812 A * 6/2000 Boggs et al. ............... 707/102

* cited by examiner

Primary Examiner—Marc S. Hoff
Assistant Examiner—Mary Catherine Baran
(74) Attorney, Agent, or Firm—Marger Johnson & McCollom

(57) ABSTRACT

A method for automated network availability analysis. A network availability analysis system receives a network topology specified by a user. The network availability analysis system produces an availability graph using that topology and performs an availability analysis setting forth the availability properties of the specified network topology.

23 Claims, 5 Drawing Sheets

METHOD FOR AUTOMATED NETWORK AVAILABILITY ANALYSIS

BACKGROUND

1. Field

This disclosure relates to network availability analysis, more particularly to tools for automated network availability analysis.

2. Background

Network availability has become a critical success factor for many applications, including telecommunications, video conferencing, telephony, voice over data networks applications and on-line transaction processing, among many others. The factor affecting network availability must be analyzed during design of network products and networks to allow prediction of availability properties. Designers can use these predicted properties to refine design decisions. It also provides customers with expected product qualities and trade-off choices between cost and reliability.

Current tools exist for facilitating the availability analysis, which include spreadsheet-based solutions, such as Cisco's SHARC tool (System Hardware Availability and Reliability Calculation). Software tools include ItemSoft's Item Tool-Kit™ for reliability block diagrams, ReliabSoft's BlockSim for simulation, Bellcore program for Markhov modeling, and University of Virginia's fault tree-based analysis tool. Bellcore is a shorthand reference to Bell Communication Research. However, none of the current tools provide automated analysis.

These tools have several limitations. First, they have no linkage to the actual network topologies or products to be analyzed, and their reliability data sources. Second, they cannot automatically traverse and analyze arbitrary network topologies. Third, they do not provide automatic analysis of networks based upon failure properties.

SUMMARY

One aspect of the disclosure is an automated network availability system. The user specifies a network topology that is received by a network availability analysis system. The network analysis system produces an availability graph using the specified network topology and performs an analysis on that graph to set forth the availability properties of the specified network topology. The system may also perform an availability versus cost analysis.

BRIEF DESCRIPTION OF THE DRAWINGS

The invention may be best understood by reading the disclosure with reference to the drawings, wherein:

FIG. 7 shows a flowchart of one embodiment of a method to provide availability versus cost analysis for a network.

DETAILED DESCRIPTION OF THE EMBODIMENTS

Network availability can be defined in several ways. Two examples of network availability metrics are Availability and Annual Downtime. Availability as used here is the percentage of mean time a component or system operates failure free over the failure-free operating time plus the failure repair time. That is:

$$\text{Availability} = MTBF/(MTBF+MTTR)$$

where MTBF (mean-time-between-failure) is the expected average time between failures of a component or system; MTTR (mean-time-to-repair) is the expected average time to restore a component or system from a failure.

Annual downtime is the expected average time duration in which a component or system is inoperable. The calculation is shown below:

$$\text{Ann. Down.} = (1-\text{Availability}) \times 365 \times 24 \times 60 \text{ minute/year.}$$

These metrics are critically important to maintaining network quality after implementation, as well as for planning purposes. Therefore, the prospective design of the network must be analyzed to achieve the best results possible for these and other metrics. This analysis is referred to here as network availability analysis.

Figure 1:
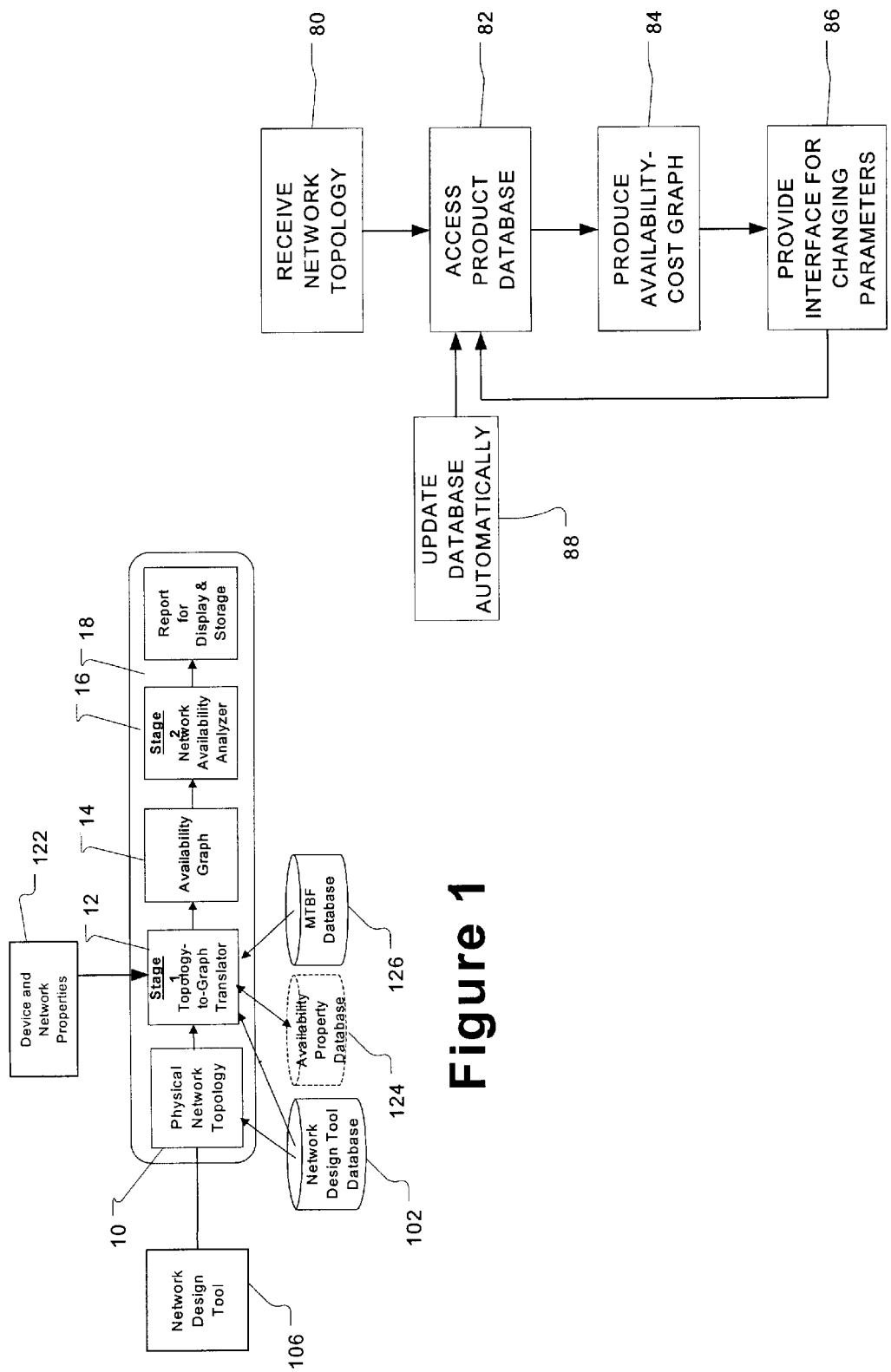
FIG. 1 shows a flowchart of one embodiment of a method for network availability analysis, in accordance with the invention.

FIG. 1 shows one embodiment of a method for network availability analysis, in accordance with the invention. As discussed previously, this process starts with a physical network topology, not with block diagram approximations of a network, but with an actual network topology and information about availability of the products. This topology 10 can be developed from a network design tool 106, or imported from a database such as 102, although there are many ways to produce such a topology. For example, the network design tool 106 may write the information to a network design tool database 102 that can be used to produce a topology.

At 12, the topology is translated into an availability graph. The availability graph 14 contains pertinent information about the network. Inputs to the translation at 12 may include device and product availability and routing properties 122, information retrieved from an availability property database 124, information from the network design tool database 102 and a mean-time-between-failures database (MTBF database) 126. The availability graph at 14 includes information about the network topology, product availability data, redundancy properties of the network and traffic routing properties.

The availability graph can take many forms. One example is a graph comprised of vertices and arcs, with each vertex representing a physical network device or link. Each vertex is associated with an availability number derived from the component availability properties. Arcs are typically undirected, but can be unidirectional or null as specified by the routing properties and policies 122.

A network availability analyzer 16 then takes the availability graph and produces analysis data in terms of the availability properties of the specified network topology.

There are various methods that can be used to perform the desired analyses. One such method identifies each unique path between two specified vertices on the availability graph. The end-to-end network availability can then be calculated and the annual downtime computed.

At 18, the analysis can then be presented and formatted into a report for display or storage for the user. Also, the user may be presented with an option to adjust the topology or other parameters to allow for a quick comparison to alternative designs. The above method is only intended as an example and is not intended to limit scope of the invention. The implementation of the method an also take many forms.

Figure 2:
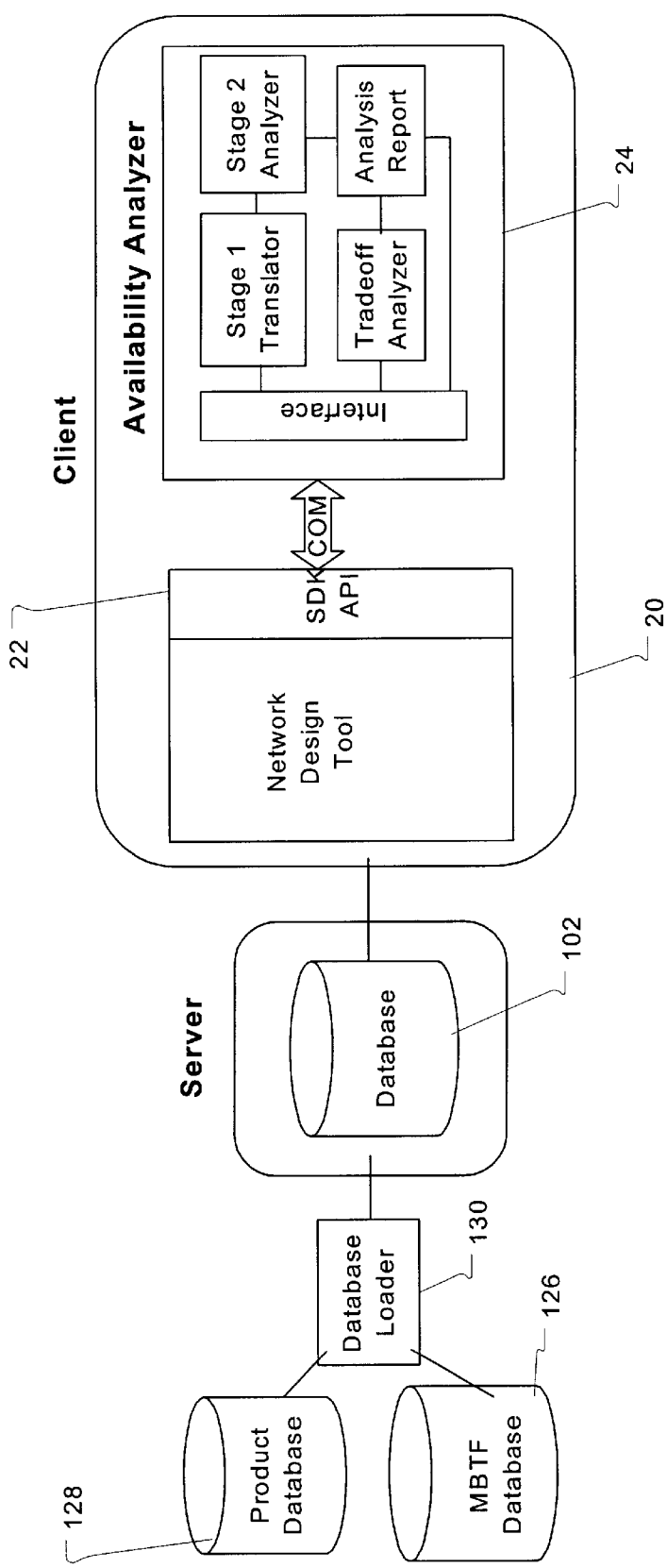
FIG. 2 shows a block diagram of one embodiment of a network availability analysis system, in accordance with the invention.

FIG. 2 shows an implementation of a network availability analysis system, in accordance with the invention. In this example, the system is divided into two components, the server side and the client side. On the server side, a product database 128 as well as the MBTF database 126 interacts with the network design tool database 102 through a database loader 130. On the client side 20, an interface module 22 interacts with the server side. It may include a graph engine that produces the topology, and a software developer's kits (SDK) application program interface (API), allowing interface between the availability analyzer and the network design tool interface. The network design tool may also includes a design tool database that provides the necessary information for the network topology, as will be discussed further. This database can be updated from the other databases on the server side.

For example, the product and reliability databases can be updated as desired. A regularly scheduled, periodic update can occur, or the user can update whenever the user feels the need. The client side may reside with the user and the analysis may be done in a local environment. The server side, in this example, would be used to update the client side with the latest information. Alternatively, the user may be presented with just an interface to the client-side and the analysis may be done over a network, such as the Internet.

Whichever way the analysis is accomplished, the analyzer module 24 performs the bulk of the analysis. In FIG. 2, the analyzer is shown demonstrating the analysis process of translating the graph into the necessary format to perform the analysis, performing the analysis, and generating a report. The term report as used here includes any output from which the user can determine the results of the analysis. The output may be a report, a display, a chart, a graph or a spreadsheet. The designation of the format of the report is left to the user or the system designer.

Figure 4:
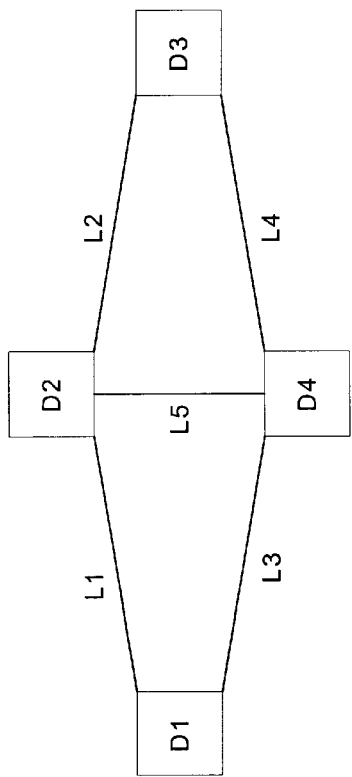
FIG. 4 shows an example of a network to be analyzed using the methods of the invention.

An optional step, which will be discussed in more detail in FIG. 4, is a trade-off analysis between cost and availability. As can be seen at 24 in FIG. 2, the report may or may not include that analysis, at the user's option.

Figure 3:
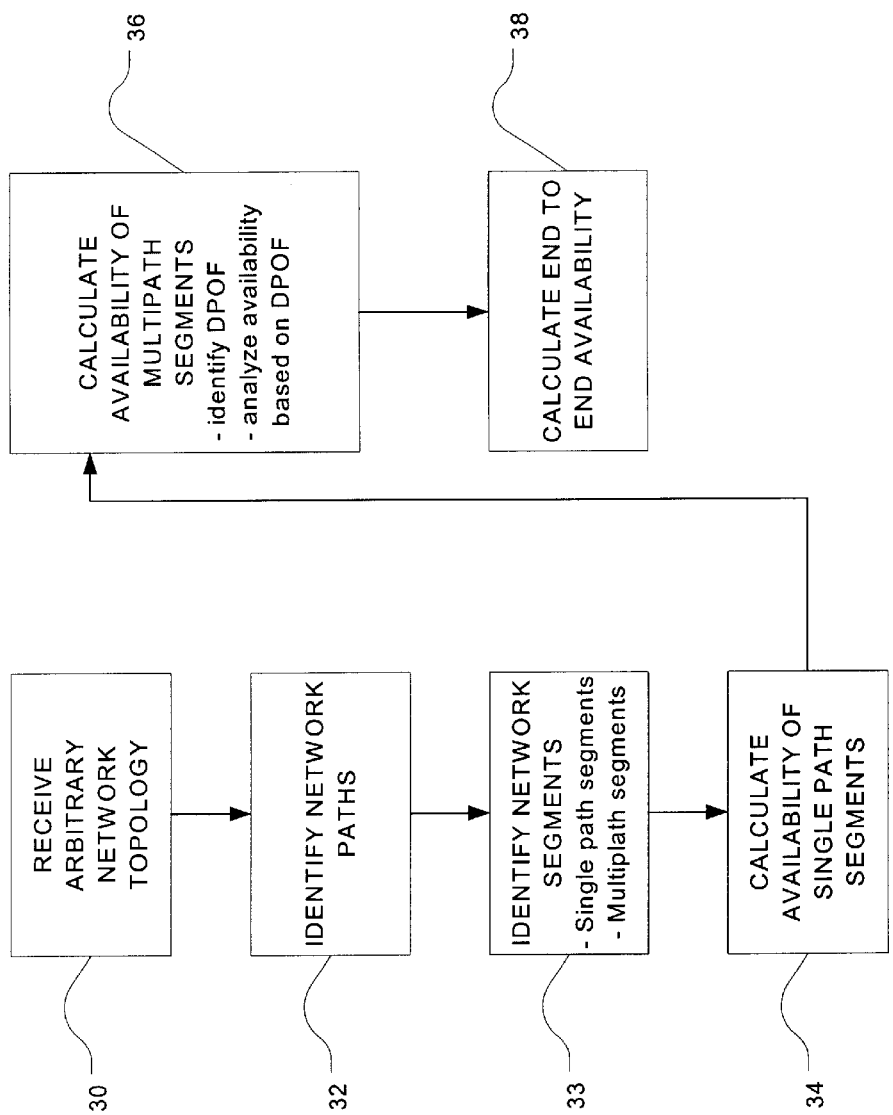
FIG. 3 shows a method of analyzing arbitrary network topologies, in accordance with the invention.

The availability analyzer 24 can perform network availability analysis on arbitrary network topologies. FIG. 3 shows one embodiment of a method of analyzing arbitrary network topologies, in accordance with the invention. An arbitrary network topology can be provided in several different ways, as mentioned above. One possibility is a graph translator, such as that shown in FIG. 2.

Figure 5:
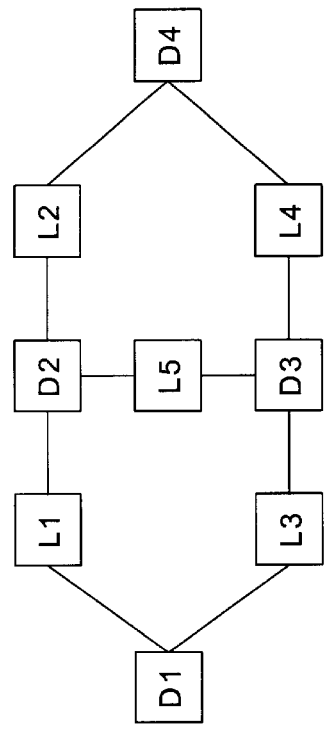
FIG. 5 shows one embodiment of a network topology translated into an availability graph, in accordance with the invention.

The graph translator converts a network topology, such as that shown in FIG. 4, to a network availability graph, such as that shown in FIG. 5. The network paths for FIG. 5 are then identified at 32 in FIG. 3. For example, for the network availability graph of FIG. 5, the network paths would be as follows:

P1={D1, L1, D2, L2, D4}
P2={D1, L3, D3, L4, D4}
P3={D1, L1, D2, L5, D3, L4, D4}
P4={D1, L3, D3, L5, D2, L2, D4}.

The availability for each path is calculated. First, the availability for each device is computed by compiling the availability data for each card in each device. This information is gathered from the MTBF database and the product availability databases to provide the actual devices used in the network and their associated reliability measures, such as MTBF and MTTR. These are used to compute the availability measure set out above. The device availability is then used to compute the path availability, and that is used to determine the overall network availability.

Figure 6:
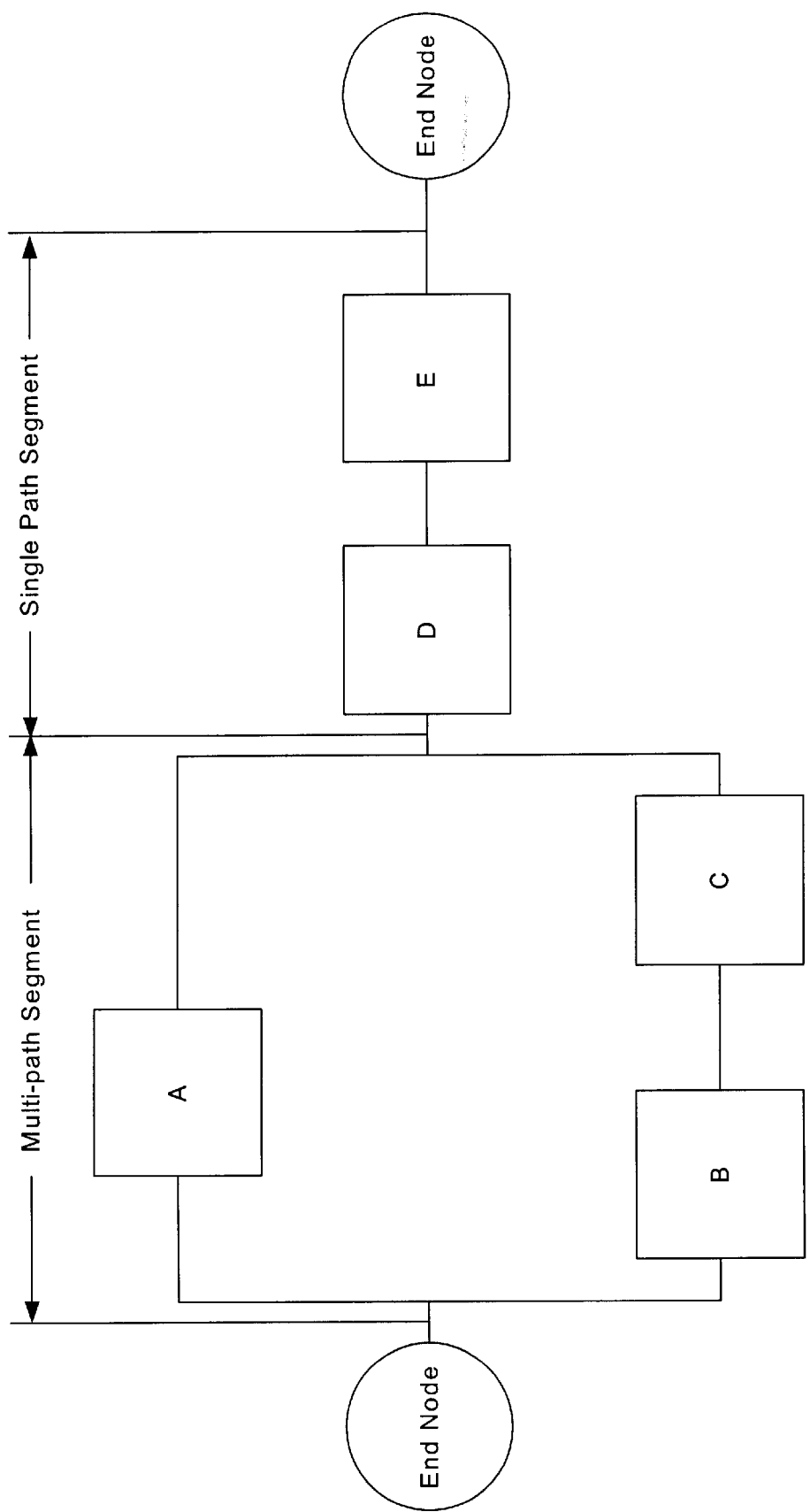
FIG. 6 shows a graphical representation of a network topology divided up into segments for point of failure analysis, in accordance with the invention.

This can be a very time consuming process. The method of FIG. 3 uses a less calculation intensive method to arrive at the availability for the network. At 33, the network is divided up into its respective segments, the signal path segments and multiple path segments. An example of this is shown in FIG. 6. The segment of the network between the left end node and the input of device D is a multiple path segment. The segment from the output of D to the input of the right end node is a single path segment.

The segmentation of the network topology is part of an approach that enables analysis of arbitrary network topologies with limited computation time. The dominant factors attributing to network downtime are single points of failure and dual points of failure. Therefore, an end-to-end network availability analysis using the unavailability resulting from these two types of failures can provide accurate results and not overburden the computational power of the system.

Generally, the end-to-end availability is approximately equal to: $1.0-U_{SPOF}-U_{DPOF}$. $U_{SPOF}$ is the network unavailability caused by single points of failure, and $U_{DPOF}$ is network unavailability caused by dual points of failure. The unavailability caused by the single points of failure is: $1.0-A_{SPATH}$, where $A_{SPATH}$ is the availability of the single path segment, such as that shown in FIG. 6. Similarly, $U_{DPOF}$ is the unavailability of the multi-path segment caused by the dual points of failure. This can be found by: $(1-A_A)(1-A_B)A_C+(1-A_A)(1-A_C)A_B$. The designation of $A_i$ is the availability of the device i.

Referring back to FIG. 3, the availability of the single path segment is calculated at 34. Referring to FIG. 6, the availability of the single-path segment, $A_{SPATH}$, is the availability of D, $A_D$ multiplied by the availability of E, $A_E$. That is, $A_{SPATH}=A_D \times A_E$. Therefore, the unavailability caused by the single points of failure for the topology in FIG. 6 is $1.0-A_D \times A_E$.

In FIG. 3, the availability of multi-path segments is determined at 36. Several options exist for calculating the availability of the multi-path segments, $A_{MPATH}$. However, as mentioned above, the heuristic embodiment can produce reasonable accuracy with limited computational time.

Using the definitions given above:

$$A \approx 1.0 - U_{SPOF} - U_{DPOF}$$

$$= 1.0 - (1.0 - A_{SPATH}) - U_{DPOF}$$

$$= 1 - (1.0 - A_D \times A_E) - [(1 - A_A)(1 - A_B)A_C + (1 - A_A)(1 - A_C)A_B]$$

$$= A_D \times A_E - (A_B + A_C - A_A \times A_B - A_A \times A_C -$$

$$2A_B \times A_C + 2A_A \times A_B \times A_C)$$

$$= 99.980001\% - 0.0000019998\%$$

$$= 99.9799990002\%$$

In comparison, consider two precise-computation methods. A path-inclusion-exclusion based precise computation is as follows.

$$P1 = A_A$$

$$P2 = A_B \times A_C$$

$$\begin{aligned}A_{MPATH} &= P1 + P2 - P1P2 \\ &= A_A + A_B \times A_C - A_A \times A_B \times A_C \\ &= 99.9999980001\%.\end{aligned}$$

An example of all failures based precise computation is shown below.

$$\begin{aligned}A_{MPATH} &= 1 - U_{DPOF} - U_{TPOF} \\ &= 1 - [(1-A_A)(1-A_B)A_C + (1-A_A)(1-A_C)A_B] - \\ & \quad (1-A_A)(1-A_B)(1-A_C) \\ &= A_A + A_B \times A_C - A_A \times A_B \times A_C \\ &= 99.9999980001\%.\end{aligned}$$

An example of dual points of failures based heuristic computation is shown below.

$$\begin{aligned}A_{MPATH} &= 1 - U_{DPOF} \\ &= 1 - [(1-A_A)(1-A_B)A_C + (1-A_A)(1-A_C)A_B] \\ &= 1 - A_B - A_C + A_A \times A_B + A_A \times A_C + 2A_B \times A_C - \\ & \quad 2A_A \times A_B \times A_C \\ &= 99.9999980002\%.\end{aligned}$$

In FIG. 3, process 36 uses the dual points of failure computation, although any of the above computations may be used, as well as other. As can be seen, the heuristic analysis result and the result from the two precise computation examples above achieve the same result up to the eleventh digit. This accuracy seems more than sufficient for availability analysis and result interpretation. Therefore, the heuristic analysis seems to be an efficient and effective method for analyzing availability of multi-path network topologies.

An optional part of this analysis is to do a cost versus availability analysis. Many network providers seek a network that has a 99.999% availability, yet the difference in cost between a 99.900% available network and a 99.999% available network may be disproportional to the extra availability gained. This analysis would produce a graph such as the one shown in FIG. 8 to allow the user to see where the costs versus availability falls for that particular network topology and devices the user selected.

Figure 8:
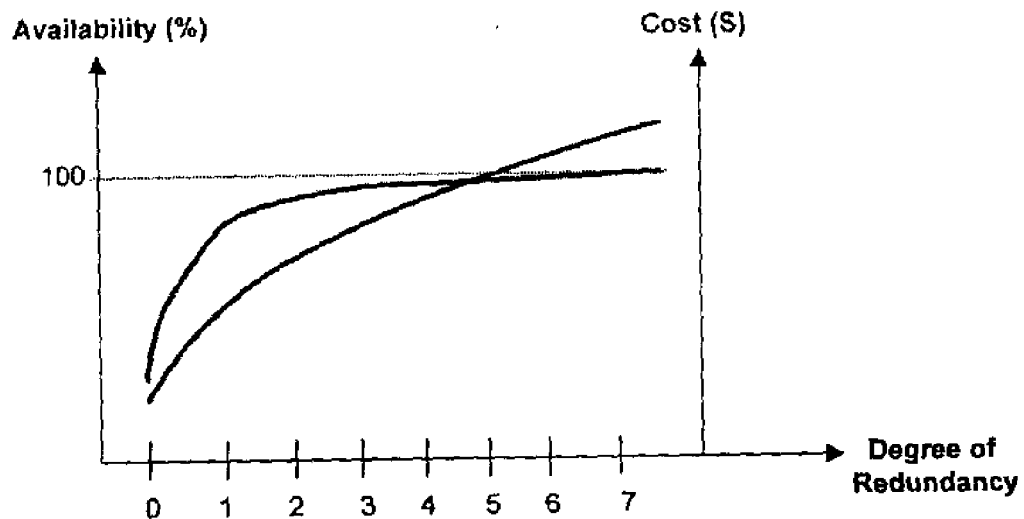
FIG. 8 shows a graph of availability versus redundancy.

For example, the graph in FIG. 8 shows that the availability line, which is the upper line, plateaus at between 2 and 3 degrees of redundancy. The '5 9's' of 99.999% availability can be achieved between 6 and 7 degrees of redundancy. However, the different in cost between 2 and 3 degrees of redundancy and 6 and 7 degrees of redundancy is far higher than a percentage point or two. This is shown in an alternative manner by the graph of FIG. 9.

A method for providing an availability versus cost trade off analysis is shown in FIG. 7. The network topology including the devices and connections is received at 80. The product database, which is an updatable database with the latest product and pricing information, is accessed at 82. The database is updated at 88. The availability analysis is then used to provide the availability numbers computed above and the costs are calculated from the database for the current topology with the user-specified degrees of redundancy. The cost is typically a summation of the costs of each of the components of the network. This is then demonstrated in an availability-cost graph at 84.

As a further alternative, the user may be allowed to alter either the topology, such as by switching to more expensive and more reliable components, or the degree of desired redundancy or both through an interface at 86. Once these parameters are changed, the process repeats with any new information coming from the product database as needed. An alternative graph is then produced, allowing the user to make decisions based upon the results of this cost analysis. Currently, network design systems and methods do not allow this type of analysis.

Typically, this system as well as these modules would be implemented in software. The instructions that perform these methods are typically embodied in an article, such as a computer disk, CD-ROM, downloadable file or an executable file.

Thus, although there has been described to this point a particular embodiment for a method and apparatus for automated network availability analysis, it is not intended that such specific references be considered as limitations upon the scope of this invention except in-so-far as set forth in the following claims.

What is claimed is:

1. A method for automated network availability analysis, the method comprising:

receiving a specified network design topology from a network configuration tool;

accessing at least one database containing information about components of the network design topology;

producing an availability graph using the specified network design topology and the information about components of the network design topology; and performing a network availability analysis, wherein the analysis sets forth predicted availability properties of the specified network topology, before implementation of the network.

2. The method of claim 1, wherein the method further comprises providing an availability versus cost trade-off analysis.

3. The method of claim 1, wherein the availability graph further comprises using the specified design network topology, associated product information, and product availability information stored in at least one database.

4. The method of claim 3, wherein the associated product information further comprises a database that is automatically updated on a periodic basis.

5. The method of claim 1, wherein the availability graph includes product availability data, redundancy properties and traffic routing properties of the network design topology.

6. The method of claim 1, wherein the network availability analysis further comprises traversing network design topologies and analyzing network availability properties.

7. The method of claim 1, wherein the network availability analysis includes at least one of the group comprised of: a network segment identifier, point of failure analysis, and an end-to-end availability analysis.

8. The method of claim 1, wherein the network availability analysis is performed in a local environment.

9. The method of claim 1, wherein the network availability analysis is performed across a network.

10. A method of performing a network availability analysis, the method comprising:

identifying network paths in a network design topology;

identifying single path segment points of failure and multi-path segments in the network design topology;

calculating availability of the single path segments;

calculating availability of the multi-path segments; and calculating the end-to-end network availability, based upon the availability of the single path segments and the availability of the multi-path segments, before implementation of the network.

11. The method of claim 10, wherein calculating availability of the multi-path segments uses heuristic dual points of failure analysis.

12. The method of claim 10, wherein calculating the availability of the multi-path segments uses path-inclusion-exclusion computation.

13. The method of claim 10, wherein calculating the availability of the multi-path segments uses all failures computation.

14. A method for providing availability-cost trade-off analysis, the method comprising:

receiving user-specified network redundancy and design network topology;

accessing product cost information; and producing a report demonstrating a degree of predicted network availability and incurred cost for the user-specified network redundancy, before implementation of the network.

15. The method of claim 14, wherein the method further comprises providing an interface through which users can alter the predicted network redundancy and the network design topology, allowing the user to view cost-availability trade offs.

16. An article including instructions that, when executed, result in:

receiving a specified network design topology from a network configuration tool;

accessing at least one database containing information about components of the network design topology;

producing an availability graph using the specified network design topology and the information about the components of the network design topology; and performing a network availability analysis, wherein the analysis sets forth predicted availability properties of the specified network topology, before implementation of the network.

17. The article of claim 16, wherein the article is a downloadable file.

18. The article of claim 16, wherein the article is an executable file accessible across a network connection.

19. The article of claim 16, wherein the at least one database is automatically updated across a network on a periodic basis.

20. A network availability analyzer, comprising:

a translator operable to translate a network design topology to a network availability graph;

an analyzer operable to provide a predicted availability measure of the network, before implementation of the network; and a report module operable to generate an availability report.

21. The analyzer of claim 20, wherein the analyzer further comprises a tradeoff analyzer operable to provide an availability versus cost analysis for the network design topology.

22. An availability analyzer, comprising:

a means for translating a network design topology to a network availability graph;

a means for providing a predicted availability measure of the network, before implementation of the network; and a means for generating an availability report.

23. The availability analyzer of claim 22, the analyzer further comprising a means for providing an availability versus cost analysis.

* * * * *

UNITED STATES PATENT AND TRADEMARK OFFICE
CERTIFICATE OF CORRECTION

PATENT NO. : 6,735,548 B1
DATED : May 11, 2004
INVENTOR(S) : Huang et al.

It is certified that error appears in the above-identified patent and that said Letters Patent is hereby corrected as shown below:

Title page,
Below ABSTRACT, "23 Claims, 5 Drawing Sheets" should read -- 23 Claims, 6 Drawing Sheets --.

Figure 9:
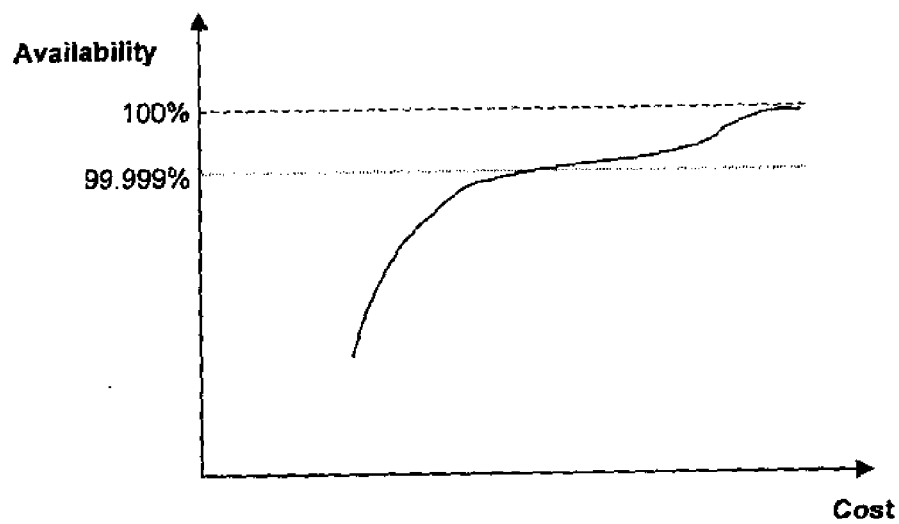
FIG. 9 shows a graph of availability versus cost.

Drawings,
Please add Figures 8 and 9, as in the attached drawings.

Signed and Sealed this

First Day of March, 2005

JON W. DUDAS
*Director of the United States Patent and Trademark Office*